3,307,625
PREVENTING CORROSION WHILE DRILLING
Grover L. Johnson, Dallas, and John Kelly, Jr., Arlington, Tex., assignors to Mobil Oil Corporation, a corporation of New York
No Drawing. Filed Apr. 27, 1964, Ser. No. 363,000
8 Claims. (Cl. 166—1)

This invention relates to a process for preventing corrosion in drilling procedures employed in forming wells in the earth, and more particularly, when a subsurface source of hydrogen sulfide is encountered.

Ferrous drilling apparatus, such as drill bits, drill pipe, collars, and casing are used in drilling procedures employed in forming wells in the earth. Usually, a drilling fluid containing water is circulated through the wells in contact with the ferrous drilling apparatus. This fluid provides the functions of lubrication, cooling, removing cuttings, etc. The drilling of wells to greater depths, as in Louisiana and the related offshore areas, has produced a troublesome problem. In many of these wells, subsurface sources are encountered which release hydrogen sulfide during drilling. These subsurface sources are usually encountered at great depths so that high temperatures, which may reach 300° F., are produced in the drilling fluids employed in drilling.

The hydrogen sulfide by continued infusion will bring about an acid environment in the drilling fluid. In such environment, especially at high temperatures, the hydrogen sulfide will rapidly corrode ferrous drilling apparatus and cause stress corrosion cracking. Further, the amount of the hydrogen sulfide infusing the drilling fluid rapidly increases since the drilling fluid is continuously circulated through the well. The infusion continues until the subsurface source is depleted or otherwise sealed from the drilling fluid. Even when the circulation of the drilling fluid is discontinued, as when drilling ceases, or when the drilling apparatus is removed from the well, the hydrogen sulfide will continue to infuse such drilling fluid locally adjacent its source until equilibrium conditions are established. Caustic to neutralize the infusing hydrogen sulfide is one remedy to this problem and requires a pH in the drilling fluid above about 9. By pH is meant in this discourse, the conventional expression of the degree of acidity or basicity of a solution. Such neutralization procedure, of course, requires stoichiometric quantities of caustic to be added to the drilling fluid. However, even a larger amount of caustic would be required throughout the drilling fluid to insure the neutralizing of the hydrogen sulfide infusing a small region in the drilling fluid during times when circulation is terminated.

It is therefore an object of this invention to provide a process for preventing corrosion in drilling procedures employed in forming wells in the earth when a subsurface source of hydrogen sulfide is encountered without the difficulties priorly described. Another object is the protection of ferrous drilling apparatus against attack by hydrogen sulfide while drilling a well with a water-containing drilling fluid. Yet another object is to protect ferrous drilling apparatus against attack by hydrogen sulfide while drilling a well without using at least stoichiometric amounts of caustic in drilling fluids. Another further object is to protect ferrous drilling apparatus against corrosive attack and stress cracking caused by infusing hydrogen sulfide during periods when drilling fluid is not circulated through the well.

These and other objects will become apparent when read in conjunction with the following detailed description of a preferred embodiment of this invention and the appended claims.

The objects of this invention are obtained by a process for preventing corrosion during drilling of wells with ferrous drilling apparatus and circulating a drilling fluid containing water. In this process, an alkali metal hydroxide is added to the drilling fluid circulated through the well when hydrogen sulfide infuses such drilling fluid. An amount of alkali metal hydroxide is added only as required to maintain the pH of the drilling fluid at least about 7. No additions of the alkali metal hydroxide are made when the pH of the drilling fluid rises to a value greater than about 9. When circulation of the drilling fluid is to be terminated, an alkali metal sulfide is added to the drilling fluid in an amount sufficient to maintain the PH of the drilling fluid at a value greater than about 9 for the time until circulation of the drilling fluid is reestablished. The steps of this drilling process are then repeated.

In the drilling procedures employed for forming wells into the earth, a drilling fluid is utilized. Generally, the drilling fluid contains water and suspended finely divided solids. The finely divided solids may be provided by cuttings produced in drilling the wells, natural clays, commercial clays such as bentonites, and other such clayey materials well known in the drilling art. Also, the drilling fluid may contain weighting materials, fluid loss control additives, and various other similar additives used in maintaining a properly conditioned drilling fluid.

In a preferred embodiment of the process of this invention, the drilling fluid is circulated through the well while the ferrous drilling apparatus is applied to extend the well into the earth. When the ferrous drilling apparatus penetrates a subsurface source, such as a subterranean formation, which contains hydrogen sulfide under pressure, the hydrogen sulfide from the source infuses the drilling fluid. Now the following step of this invention is practiced. An alkali metal hydroxide is added to the drilling fluid circulated through the well. The alkali metal hydroxide is selected from the group consisting of the hydroxides of sodium, potassium, and lithium. Preferably, the alkali metal hydroxide is sodium hydroxide because of its low cost and ready availability. The alkali metal hydroxide may be added as a solid or in a solution with a solvent which usually is water. The alkali metal hydroxide is added in an amount to provide in the circulated drilling fluid a pH of at least about 7. Large amounts of the alkali metal hydroxide in approximate stoichiometric quantities to the hydrogen sulfide are not required. Moreover, the pH need not be raised above 7 in this step for purposes of this invention. Thus, a savings in the amount of the alkali metal hydroxide added in this step over that required to completely react with the hydrogen sulfide to a pH of about 9 is obtained.

At a pH of at least about 7 in the drilling fluid obtained by adding the alkali metal hydroxide, the amount of sulfide ions increases, relative to the amount of hydrogen sulfide, sufficiently to react with the elemental iron in the ferrous drilling apparatus to form a durable coating of ferrous sulfide. The ferrous sulfide coating, or film, is disposed over the surfaces of the ferrous drilling apparatus exposed to the drilling fluid as a barrier to corrosive agents in the drilling fluid. This film when formed at a pH of at least about 7 is especially tenacious and will protect the ferrous drilling apparatus to which it is appended from any further corrosion damage by various corrosive agents, especially stress cracking caused by hydrogen sulfide. Thus, by this step, the coating of ferrous sulfide is formed continuously over increased portions of the ferrous drilling apparatus as long as a supply of hydrogen sulfide exists and the pH of the drilling fluid is at least above 6 and preferably at least about 7 for best results.

Preferably, the alkali metal hydroxide is added to the drilling fluid circulated into the well. By this means, the alkali metal hydroxide is thoroughly mixed with the drilling fluid before reaching the location where infusion of of hydrogen sulfide into the well takes place. Also, the pH of the drilling fluid is established before it reaches such location so that when the hydrogen sulfide begins to infuse the drilling fluid the ferrous sulfide film immediately begins to form on the exposed surfaces of the ferrous drilling apparatus.

The pH of the drilling fluid for this step of the invention preferably is determined on the drilling fluid circulated from the well. This is of advantage since all of the drilling fluid throughout the well will have at least this pH value.

Any means for determining the pH of the drilling fluid may be used. Conventional electronic meters for measuring pH can be used with great facility. Other means can be used if desired for making the pH determination. The values of pH used in this disclosure are those of the drilling fluid at ambient pressure and temperatures existing at the earth's surface. Those skilled in the art can determine the equivalent pH values for other physical environments. The term "about" in reference to a certain pH value includes the range of accuracy and variations normally encountered. Generally, "about" may be taken as a pH plus or minus 0.5.

As another step in this invention, the addition of the alkali metal hydroxide into the drilling fluid is discontinued when such circulated fluid has a pH greater than about 9. Preferably, the pH is determined on the drilling fluid circulated from the well, for the reasons previously stated with regard to the priorly mentioned step. Generally, the pH of the drilling fluid, after adding the alkali metal hydroxide thereto for some time, will rather suddenly rise to values of pH between about 9 and about 10. This rise in pH occurs after the formation of a ferrous sulfide film over all surfaces of the ferrous drilling apparatus exposed to the drilling fluid and when additional infused hydrogen sulfide reacts with the alkali metal hydroxide to form the corresponding alkali metal sulfide salts. These sulfide salts ionize in the drilling fluid to produce a pH of between about 9 and about 10. Another causation for such result is the presence of excess amounts of the alkali metal hydroxide in the drilling fluid after the source of hydrogen sulfide is depleted. In either event, further additions of alkali metal hydroxide into the drilling fluid are not required until the pH falls below 7. Then, of course, the prior steps are repeated.

As the next step of this invention, a water soluble alkali metal sulfide is distributed in the drilling fluid in the well, while hydrogen sulfide may yet infuse the well, and at a time just prior to termination of fluid circulation in the well. A water soluble alkali metal sulfide selected from the group consisting of sodium sulfide, sodium polysulfides, and sodium hydrosulfide can be used. Preferably, the water soluble alkali metal sulfide is sodium sulfide because of its availability. The alkali metal sulfide may be distributed in any form that is convenient, as a solid or in a solution with a suitable solvent such as water. The amount of the water soluble alkali metal sulfide to be distributed in the drilling fluid is that amount required to maintain the pH of such fluid at a value greater than about 9 for the period until fluid circulation is re-established through the well. This required amount is easily determined from knowledge of the amount of hydrogen sulfide which will infuse into the drilling fluid during static conditions when circulation of the drilling fluid is terminated by those skilled in the art. The amount of the alkali metal sulfide to be distributed is such that excess alkali metal ions are always present in the drilling fluid for the period when circulation is terminated. Under these conditions the pH in the drilling fluid will be greater than about 9.

The infusion of hydrogen sulfide into the drilling fluid during periods when drilling fluid circulation is terminated is small because equilibrium conditions for gas infusion are reached quickly as a result of the hydrostatic pressure and temperatures in the well, and for other reasons. For practical purposes, the amount of the alkali metal sulfide can be about 100 parts per million by weight to preserve in most wells the ferrous sulfide film which has been formed on the ferrous drilling apparatus. Only in exceptional circumstances, such as where the infusing hydrogen sulfide does not reach equilibrium in the well when circulation of drilling fluid is terminated, need greater amounts of the alkali metal sulfide be used. It will be apparent to those skilled in the art that the alkali metal sulfide serves as a buffer for the sulfide anion. Thus, the quantities of hydrogen sulfide which enter the drilling fluid cause the sulfide anion concentration to increase, but since the equilibrium of the ratio of dissociated alkali metal sulfide to the nondissociated material is constant, the equilibrium is re-established with the result that the pH of the drilling fluid always will be greater than about 9 and no hydrogen sulfide will exist to cause corrosion problems, especially stress cracking. Obviously, small amounts of the alkali metal sulfide will buffer relatively large amounts of hydrogen sulfide to maintain the pH of the drilling fluid greater than about 9. If desired, the alkali metal sulfide may be distributed only into the static fluid circulating location in the well where hydrogen sulfide infuses the drilling fluid.

When circulation of the drilling fluid resumes, the priorly described steps are repeated while hydrogen sulfide yet infuses the drilling fluid.

From the foregoing description, it is apparent that there has been described a process well suited to obtain satisfaction of all of the stated objects of this invention. Various changes and alterations may be made to the described process without departing from the spirit of this invention. However, it is intended that such changes and alterations come within the scope of the appended claims, which claims set forth the only limitations of this invention.

What is claimed is:

1. A process for preventing corrosion in the drilling of a well with ferrous drilling apparatus wherein there is circulated through the well a water-containing drilling fluid, comprising the steps of:
   (a) circulating the drilling fluid through the well while the ferrous drilling apparatus is applied to deepen the well,
   (b) adding an alkali metal hydroxide to the drilling fluid circulated into the well at a time when hydrogen sulfide from a subsurface source begins to infuse such fluid in the well and in an amount sufficient to provide a pH of at least about 7 in the drilling fluid circulated out of the well,
   (c) discontinuing the addition into the drilling fluid of said alkali metal hydroxide when the drilling fluid circulated from the well has a pH of about 9, and
   (d) distributing a water soluble alkali metal sulfide into the drilling fluid in the well just prior to termination of fluid circulation through the well while hydrogen sulfide yet infuses the drilling fluid, said alkali metal sulfide being introduced in an amount sufficient to maintain the pH of the drilling fluid within the well at a value greater than about 9 until fluid circulation is re-established and then repeating the foregoing steps.

2. The process of claim 1 in which the alkali metal hydroxide is selected from the group consisting of the hydroxides of sodium, potassium, and lithium.

3. The process of claim 1 in which the water soluble alkali metal sulfide is selected from the group consisting of sodium sulfide, sodium polysulfides, and sodium hydrosulfides.

4. The process of claim 1 in which the alkali metal hydroxide is sodium hydroxide and the alkali metal sulfide is sodium sulfide.

5. A process for preventing corrosion in the drilling of a well with ferrous drilling apparatus wherein there is circulated through the well a water-containing drilling fluid, comprising the steps of:

(a) circulating the drilling fluid through the well while the ferrous drilling apparatus is applied to deepen the well, (b) adding an alkali metal hydroxide to the drilling fluid as it is circulated into the well when hydrogen sulfide from a subsurface source begins to infuse such fluid in the well and in an amount sufficient to maintain a pH in the drilling fluid circulated from the well from at least about 7 to a value not greater than about 9, (c) discontinuing the addition into the drilling fluid of said alkali metal hydroxide when the drilling fluid circulated from the well has a pH of about 9, and (d) distributing a water soluble alkali metal sulfide into the drilling fluid in the well just prior to termination of fluid circulation in the well while hydrogen sulfide yet infuses the drilling fluid, said alkali metal sulfide being introduced in an amount sufficient to maintain the pH of the drilling fluid at a value greater than 9 until fluid circulation is re-established and then repeating the foregoing steps.

6. The process of claim 5 in which the alkali metal hydroxide is selected from the group consisting of the hydroxides of sodium, potassium, and lithium.

7. The process of claim 5 in which the water soluble alkali metal sulfide is selected from the group consisting of sodium sulfide, sodium polysulfides, and sodium hydrosulfides.

8. The process of claim 5 in which the alkali metal hydroxide is sodium hydroxide and the alkali metal sulfide is sodium sulfide.

References Cited by the Examiner

UNITED STATES PATENTS

| | | | |
|---|---|---|---|
| 1,829,705 | 10/1931 | Walker | 252—389 |
| 2,474,603 | 6/1949 | Viles et al. | 252—8.55 |
| 2,485,231 | 10/1949 | Bond et al. | 252—8.55 |
| 2,776,259 | 1/1957 | Salathiel | 252—8.5 |
| 2,781,313 | 2/1957 | Salathiel | 252—8.5 |

OTHER REFERENCES

Rogers: Composition and Properties of Oil Well Drilling Fluids, Gulf Publication Co., 1948, pp. 280–282.

CHARLES E. O'CONNELL, *Primary Examiner.*

J. A. LEPPINK, *Assistant Examiner.*